(12) United States Patent
Kaieda

(10) Patent No.: US 6,896,845 B2
(45) Date of Patent: *May 24, 2005

(54) PROCESS FOR PREPARING WC CEMENTED CARBIDE

(75) Inventor: Yoshinari Kaieda, Ibaraki (JP)

(73) Assignee: National Institute for Materials Science, Ibaraki (JP)

(*) Notice: Subject to any disclaimer, the term of this patent is extended or adjusted under 35 U.S.C. 154(b) by 62 days.

This patent is subject to a terminal disclaimer.

(21) Appl. No.: 10/385,655

(22) Filed: Mar. 12, 2003

(65) Prior Publication Data

US 2003/0223901 A1 Dec. 4, 2003

(30) Foreign Application Priority Data

Mar. 13, 2002 (JP) .................................... 2002-069240

(51) Int. Cl.⁷ .............................................. C22C 32/00
(52) U.S. Cl. .......................................... 419/18; 419/45
(58) Field of Search .................................... 419/18, 45

(56) References Cited

U.S. PATENT DOCUMENTS 5,188,678 A * 2/1993 Sekhar et al. ............... 148/514
5,380,409 A * 1/1995 Munir et al. ................ 205/340
5,996,385 A * 12/1999 Kecskes ...................... 72/56

FOREIGN PATENT DOCUMENTS

| JP | 1344592 A2 * | 9/2003 | ............. B22F/3/10 |
| JP | 1344759 A2 * | 9/2003 | ........... C04B/35/56 |

OTHER PUBLICATIONS

Derwent 2000–298826, "Combustion synthesis process for manufacturing cemented carbide involves of reactive powder mixture, heating by applying pressure, sintering and recovering", 2 pages, Apr. 28, 2000.*

* cited by examiner

Primary Examiner—Daniel J. Jenkins
(74) Attorney, Agent, or Firm—Wenderoth, Lind & Ponack, L.L.P.

(57) ABSTRACT

W powders and C powders are mixed at a ratio of 1:1, the raw material mixed powder is compacted to prepare a formed body, the formed body is embedded into a powder mixture capable of performing combustion synthesis, a part of the powder mixture is powerfully heated to ignite the part and perform combustion synthesis, and according to heat of formation released, a reaction represented by $W+C \rightarrow WC$ is induced and the reaction is subjected to combustion synthesis to convert a whole of the formed body into sintered WC.

12 Claims, 1 Drawing Sheet

PROCESS FOR PREPARING WC CEMENTED CARBIDE

FIELD OF THE INVENTION

The present invention relates to a process for preparing a WC cemented carbide. More particularly, the present invention relates to a process for preparing a WC cemented carbide which can facilitate preparation of a WC cemented carbide having a high melting point and a high hardness, shorten a manufacturing time, and promote reduction of a manufacturing cost.

DESCRIPTION OF THE PRIOR ART

According to the powder metallurgy technique, a WC cemented carbide having a high melting point and a high hardness has been prepared as follows:

That is, W and C are mixed or W and C with a prescribed amount of Co are mixed, the mixture is compacted to prepare a formed body, and the formed body is sintered by retaining at a high temperature for a long time in a hydrogen furnace. Such the process is adopted because both of W and C have a very high melting point exceeding 3000° C., and WC also has a melting point in a temperature range of 2600° C. to 2900° C. and, therefore, in order that W and C are mutually diffused and sintered, a relatively high temperature is required.

As apparent from the foregoing, since the previous preparation of a WC cemented carbide by the powder metallurgy technique uses a hydrogen furnace, there is a problem that a considerable attention must be paid to the safety, manufacturing is not easy, and a manufacturing time is long reflecting on a manufacturing cost.

The present invention has an object is to provide a process for preparing a WC cemented carbide which can facilitate preparation of a WC cemented carbide having a high melting point and a high hardness and, at the same time, shorten a manufacturing time, and promote reduction of a manufacturing cost.

This and other objects, features and advantages of the invention will become more apparent upon reading of the following detailed specification and drawings, in which:

DETAILED DESCRIPTION OF THE INVENTION

Figure 1:
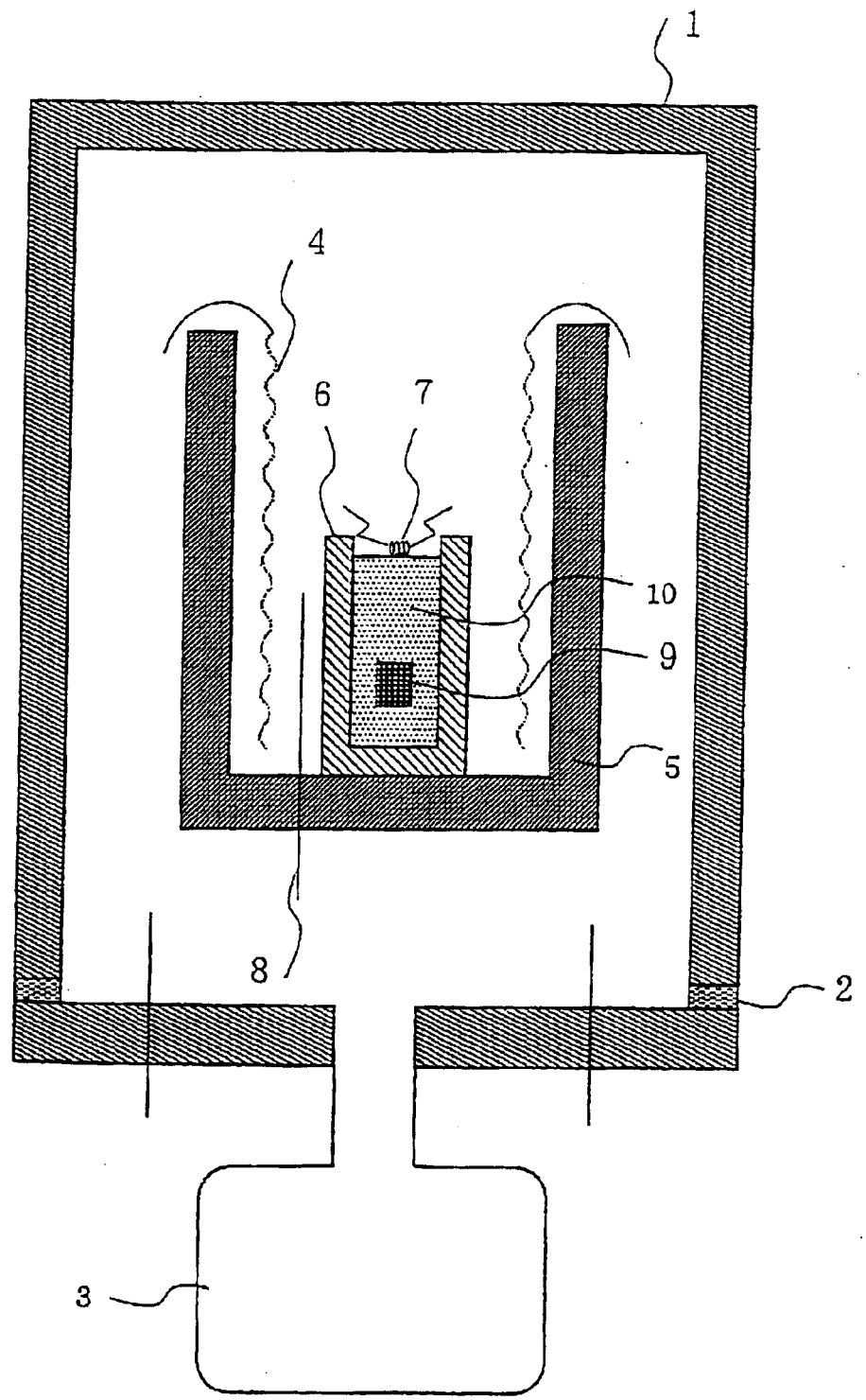
FIG. 1 is a cross-sectional view showing outline of an apparatus for combustion synthesis, which can be applied to the process for preparing a WC cemented carbide of the present invention.

In order to solve the above problems, the inventor of the present invention intensively studied in order to generate a high temperature without using a hydrogen furnace, allow a reaction of W and C to be performed as rapidly as possible, and shorten a synthesizing time.

The inventor of the present invention has succeeded in the development of combustion synthesis of a carbide and a boride. Combustion synthesis refers to synthesis in which a part of a powder mixture is powerfully heated to ignite and cause an initial reaction, heat of formation produced is successively propagated to cause a chain reaction, and a whole of the powder mixture is synthesized into a compound such as a carbide and a boride.

Then, a possibility of combustion synthesis has been studied regarding WC. However, the result is that a reaction represented by W+C→WC and its chain reaction are hardly caused. The reason is first that heat of formation of WC is very small as compared with that of other carbides and borides. Heat of formation for representative carbides and borides performing combustion synthesis is as follows:

That is, heat of formation is −184 kJ/mol in the case of TiC, −148.5 kJ/mol in the case of TaC, −218.8 kJ/mol in the case of HfC, −140.6 kJ/mol in the case of NbC, −279.9 kJ/mol in the case of $TiB_2$, −326.6 kJ/mol in the case of $ZrB_2$, −328.9 kJ/mol in the case of $HfB_2$. On the other hand, heat of formation of WC is 40.2 kJ/mol, which is very small.

Secondarily, it is pointed that melting points of W, C and WC are very high. Even when, in order to cause an initial reaction, a part of raw material mixed powders is tried to be powerfully heated to ignite, it is difficult to elevate a temperature until W and C are mutually diffused and reacted. Therefore, combustion synthesis is difficult.

However, in order to overcome the aforementioned problems, the inventor of the present invention further studied, and as a result, found that combustion synthesis of a WC cemented carbide is possible.

As described above, for example, heat of formation of TiC is −184 kJ/mol, and combustion synthesis easily caused, but an adiabatic temperature when performing combustion synthesis is 2937° C., which reaches almost a melting point of WC. However, actually, heat of formation of TiC is absorbed by specific heats of W, C and WC and, when a ratio of an amount of raw material mixed powders of W and C and an amount of a powder mixture of Ti and C are in a suitable range, an adiabatic temperature of TiC during combustion synthesis does not exceed a melting point of WC. Therefore, a reaction represented by W+C→WC is induced by reaction heat released from combustion synthesis of TiC, and combustion synthesis of W and C is caused. That is, heat which is necessary for combustion synthesis of W and C is complemented by heat of formation of compound including TiC, which is capable of performing combustion synthesis. Necessary time for combustion synthesis of W and C becomes short, for example, a few seconds or shorter when an amount of a formed body of W and C prepared by compacting is a few gram to a few tens gram.

The present invention is completed by the aforementioned finding, and provides a process for preparing a WC cemented carbide, which comprises the steps of mixing W powders and C powders at a ratio of 1:1, compacting a raw material mixed powders to obtain a formed body, embedding the formed body into a powder mixture capable of performing combustion synthesis, powerfully heating the powder mixture at a part to ignite the part and perform combustion synthesis, inducing a reaction represented by W+C→WC according to heat of formation released during combustion synthesis, and subjecting the reaction to combustion synthesis to convert a whole of the formed body into sintered WC.

The present invention provides one of the aspects which comprise an aspect in which the powder mixture capable of performing combustion synthesis is one of the powder mixtures selected from the group consisting of Ti and C, Zr and C, Nb and C, Ta and C, Hf and C, Ti and B, Zr and B, and Hf and B, an aspect in which combustion synthesis of WC is performed under the conditions of a room temperature or higher and 500° C. or lower in vacuum, an aspect in which a vacuum degree is set at $5 \times 10^{-1}$ Torr or lower, and an aspect in which the powder mixture capable of performing combustion synthesis is pre-heated in vacuum to remove a moisture and volatile impurities contained in the powder mixture.

The process for preparing a WC cemented carbide of the present invention will be explained in more detail below.

EMBODIMENTS

In the process for preparing a WC cemented carbide of the present invention, W powders and C powders are mixed at a ratio of 1:1, the raw material mixed powder is compacted to obtain a formed body, which is embedded into a powder mixture capable of performing combustion synthesis. A prescribed amount of Co may be added to a raw material mixed powder of W powders and C powders as previously. The powder mixture capable of performing combustion synthesis is any one of powder mixtures such as Ti and C, Zr and C, Nb and C, Ta and C, Hf and C, Ti and B, Zr and B, and Hf and B that are capable of performing combustion synthesis. Besides, regarding the powder mixture capable of performing combustion synthesis, adiabatic temperature during combustion synthesis is sufficiently high and heat of formation generated can induce a reaction presented by $W+C \rightarrow WC$.

Then, in the process for preparing a WC cemented carbide of the present invention, a powder mixture capable performing combustion synthesis is powerfully heated at a part to ignite the part and perform combustion synthesis. Heat of formation released from combustion synthesis causes a reaction presented by $W+C \rightarrow WC$ to be induced and the reaction is subjected to combustion synthesis to convert a whole of the formed body into sintered WC.

More specifically, when the process for preparing a WC cemented carbide of the preset invention is performed, an apparatus for combustion synthesis, outline of which is shown in FIG. 1, can be employed.

As show in FIG. 1, an apparatus for combustion synthesis is provided with a vacuum container (1). The vacuum container (1) is sealed with a sealing mechanism (2) and is connected to a gas supplying and discharging system (3), allowing gasses in the interior to be supplied and discharged. In the interior of this vacuum container (1), an electric furnace (5) provided with a heater (4) and a thermocouple (8) is arranged. In the interior of the electric furnace (5), a refractory crucible (6) is disposed. A powder mixture (10) capable of performing combustion synthesis such as Ti and C is filled in the refractory crucible (6).

In addition, in the apparatus for combustion synthesis, an electrically heating coil (7) for powerfully heating a part of the powder mixture (10) capable of performing combustion synthesis to ignite the part, which can be formed of a tungsten wire or a nichrome wire, is arranged. The electrically heating coil (7) is arranged so as to contact with an upper end of the powder mixture (10) filled in the refractory crucible (6).

The aforementioned heater (4), electrically heating coil (7) and thermocouple (8) are all drawn to an outside from the vacuum container (1) so that the airtight state is retained. The heater (4), electrically heating coil (7) and thermocouple (8) are electrically connected to power supply and a controller and can be operated from an outside.

When preparing a WC cemented carbide, W powders and C powders are mixed at an atomic ration of 1:1, the raw material mixture powder, as it is or after a prescribed amount of Co is added, is compacted to prepare a formed body (9). The formed body (9) is embedded into a powder mixture (10) capable of performing combustion synthesis, which is filled in the refractory crucible (6). Prior to embedding into the formed body (9), the powder mixture (10) is pre-heated in vacuum to remove a moisture and volatile impurities contained in the powder mixture (10), whereby, a WC cemented carbide having a better quality is obtained.

Thereafter, the refractory crucible (6) is placed into the electric furnace (5) and the vacuum container (1) is sealed with a sealing mechanism (2). Then, the interior of the vacuum container (1) is evacuated to vacuum by actuation of the gas supplying and discharging system (3). It is preferable that a vacuum degree at that time is set to be suitable for causing combustion synthesis of WC, for example, a vacuum degree being $5 \times 10^{-1}$ Torr or lower. In addition, as a vacuum degree is heightened, it is effective to suppress production of an oxide.

Then, an electrically heating coil (7) is arranged contacting with a part of the powder mixture (10), more particularly, an upper end as shown in FIG. 1, and electrical current is passed through the electrically heating coil (7) to powerfully heat to ignite the upper end of the powder mixture (10), that is, a part of the powder mixture (10). After ignition, in the powder mixture (10), an initial reaction, for example in the case of a powder mixture (10) of Ti and C, a reaction represented by $Ti+C \rightarrow TiC$ occurs, heat of formation produced is successively propagated to cause a chain reaction. Combustion synthesis occurs. Finally, a whole of the powder mixture (10) is converted into a compound such as a carbide such as TiC, and a boride. In addition, according to heat of formation released from combustion synthesis of the powder mixture (10), a reaction represented by $W+C \rightarrow WC$ is induced, and the formed body (9), although having the small heat of formation, is subjected to combustion synthesis, and a whole of the formed body (9) is converted into sintered WC. Generally, when an amount of the formed body (9) is from a few gram to a few tens gram, necessary time for combustion synthesis of WC is very short by a few seconds or shorter.

As described above, it is preferable that combustion synthesis of WC is performed in vacuum. Besides, when a temperature in the electric furnace (5) is retained at a room temperature or higher and 500° C. or lower by the heater (4), a yield of a WC cemented carbide becomes almost 100%.

A WC cemented carbide, which was impossible to be synthesized by combustion synthesis due to the small heat of formation, can be prepared by combustion synthesis without using a hydrogen furnace requiring a careful handling and in a short time. Preparation of a WC cemented carbide is facilitated, which promotes reduction of a manufacturing cost.

EXAMPLES

Using W powders having an average particle diameter of about 20 $\mu$m, C powders having an average particle diameter of about 15 $\mu$m and Ti powders having an average particle diameter of 30 $\mu$m, the W powders and C powders were mixed at an atomic ration of 1:1 and prepared into a cylindrical formed body having a thickness of around 10 mm with a circular mold having a diameter of 11.28 mm under a forming pressure of 150 MPa. The formed body was packed into a polyurethane rubber mold, a forming pressure of 400 MPa was applied isostatically by cold isostatic pressing (CIP), and the pressure was retained for 1 minute to reform. According to the same process as described above, Co was added to a mixed powder of W and C to 10% as in a normal cemented carbide. A few kinds of formed bodies were obtained.

On the other hand, as a powder mixture capable of performing combustion synthesis, the aforementioned powder mixture of Ti and C was prepared and retained at 200° C. for 12 hours to dry.

Then, a powder mixture of Ti and C as a powder mixture (10) capable of performing combustion synthesis was placed into a refractory crucible (6) in an apparatus for combustion synthesis, as shown in FIG. 1, and a formed body (9) of W and C or additionally containing Co was embedded the powder mixture (10). Thereafter, the refractory crucible (6) was disposed in the electric furnace (5) and an electrically heating coil (7) formed of a tungsten wire having a wire diameter of 0.6 mm was arranged contacting with an upper end of the powder mixture of Ti and C. In this state, a vacuum container (1) was sealed with a sealing mechanism (2), the interior of the vacuum container (1) was evacuated to vacuum with a gas supplying and discharging system (3), and a vacuum degree was always retained at $1 \times 10^{-3}$ Pa or lower. An electrical current of around 20A was passed through an electrically heating coil (7) to powerfully heat an upper end of the powder mixture of Ti and C to ignite the upper end.

After ignition, a reaction represented by Ti+C→TiC was caused, heat of formation produced generated was successively propagated to cause a chain reaction. A whole of the powder mixture (10) was synthesized into TiC in a short time by combustion synthesis. Further, according to the heat of formation released from combustion synthesis of TiC, an initial reaction represented by W+C→WC was induced in the formed body (9) and combustion synthesis occurred. A whole of the formed body (9) was converted into sintered WC. In the case of any one of the formed bodies, a WC cemented carbide having an almost single phase was obtained.

Of course, the present invention is not limited by the above embodiments and Examples. Regarding details of the conditions at combustion synthesis, a particle diameter of powder to be used, and a kind of a powder mixture to be subjected to combustion synthesis, various modifications will be possible.

What is claimed is:

1. A process for preparing a WC cemented carbide, which comprises the steps of mixing W powders and C powders at a ratio of 1:1, compacting a raw material mixed powders to obtain a formed body, embedding the formed body into a powder mixture capable of performing combustion synthesis, powerfully heating the powder mixture at a part to ignite the part and perform combustion synthesis, inducing a reaction represented by W+C→WC according to heat of formation released during combustion synthesis, and subjecting the reaction to combustion synthesis to convert a whole of the formed body into sintered WC.

2. The process for preparing a WC cemented carbide according to claim 1, wherein the powder mixture capable of performing combustion synthesis is one of the powder mixtures selected from the group consisting of Ti and C, Zr and C, Nb and C, Ta and C, Hf and C, Ti and B, Zr and B, and Hf and B.

3. The process for preparing a WC cemented carbide according to claim 1, wherein combustion synthesis of WC is performed under the conditions of a room temperature or higher and 500° C. or lower in vacuum.

4. The process for preparing a WC cemented carbide according to claim 2, wherein combustion synthesis of WC is performed under the conditions of a room temperature or higher and 500° C. or lower in vacuum.

5. The process for preparing a WC cemented carbide according to claim 3, wherein a vacuum degree is set at $5 \times 10^{-1}$ Torr or lower.

6. The process for preparing a WC cemented carbide according to claim 4, wherein a vacuum degree is set at $5 \times 10^{-1}$ Torr or lower.

7. The process for preparing a WC cemented carbide according to claim 1, wherein the powder mixture capable of performing combustion synthesis is pre-heated in vacuum to remove a moisture and volatile impurities contained in the powder mixture.

8. The process for preparing a WC cemented carbide according to claim 2, wherein the powder mixture capable of performing combustion synthesis is pre-heated in vacuum to remove a moisture and volatile impurities contained in the powder mixture.

9. The process for preparing a WC cemented carbide according to claim 3, wherein the powder mixture capable of performing combustion synthesis is pre-heated in vacuum to remove a moisture and volatile impurities contained in the powder mixture.

10. The process for preparing a WC cemented carbide according to claim 4, wherein the powder mixture capable of performing combustion synthesis is pre-heated in vacuum to remove a moisture and volatile impurities contained in the powder mixture.

11. The process for preparing a WC cemented carbide according to claim 5, wherein the powder mixture capable of performing combustion synthesis is pre-heated in vacuum to remove a moisture and volatile impurities contained in the powder mixture.

12. The process for preparing a WC cemented carbide according to claim 6, wherein the powder mixture capable of performing combustion synthesis is pre-heated in vacuum to remove a moisture and volatile impurities contained in the powder mixture.

* * * * *